(12) United States Patent
Sun

(10) Patent No.: US 8,914,944 B2
(45) Date of Patent: Dec. 23, 2014

(54) HANDCART CASTER

(71) Applicant: Cixi Chuangli Bearing Co. Ltd., Ningbo, Zhejiang (CN)

(72) Inventor: Bo Sun, Ningbo (CN)

(73) Assignee: Cixi Chuangli Bearing Co., Ltd., Ningbo (CN)

( * ) Notice: Subject to any disclaimer, the term of this patent is extended or adjusted under 35 U.S.C. 154(b) by 0 days.

(21) Appl. No.: 14/154,211

(22) Filed: Jan. 14, 2014

(65) Prior Publication Data

US 2014/0123435 A1 May 8, 2014

(30) Foreign Application Priority Data

Nov. 25, 2013 (CN) .......................... 2013 1 0603429

(51) Int. Cl.
- *B60B 33/00* (2006.01)
- *F16C 35/067* (2006.01)
- *F16C 13/00* (2006.01)
- *F16C 19/08* (2006.01)
- *F16C 33/41* (2006.01)

(52) U.S. Cl.
CPC ......... *B60B 33/0028* (2013.01); *B60B 33/0007* (2013.01); *B60B 33/0021* (2013.01); *F16C 35/067* (2013.01); *B60B 33/0039* (2013.01); *B60B 33/0049* (2013.01); *B60B 33/0068* (2013.01); *F16C 13/006* (2013.01); *F16C 19/08* (2013.01); *F16C 33/414* (2013.01)
USPC .............................. 16/20; 16/48; 16/38; 16/37

(58) Field of Classification Search
CPC ............ B60B 33/0049; B60B 33/0068; B60B 33/0057; B60B 33/0071; B60B 33/0073; B60B 33/0076; B60B 33/0026; B60B 33/021; B60B 33/023

USPC ..... 16/45, 48, 43, 20, 21, 38, 39, 31 R, 31 A; 188/1.12; 280/47.38, 642, 647, 650, 280/651, 654

See application file for complete search history.

(56) References Cited

U.S. PATENT DOCUMENTS

| 4,035,043 | A | * | 7/1977 | Markley ........................ 384/613 |
| 5,214,823 | A | * | 6/1993 | Screen .......................... 16/35 D |
| 5,593,461 | A | * | 1/1997 | Reppert et al. ..................... 29/11 |
| 5,639,168 | A | * | 6/1997 | Noguchi et al. ............... 384/492 |
| 5,664,645 | A | * | 9/1997 | Rodriguez ................... 188/1.12 |
| 6,047,439 | A | * | 4/2000 | Stearn ............................... 16/30 |

(Continued)

FOREIGN PATENT DOCUMENTS

| JP | 2002347408 | A | * | 12/2002 |
| JP | 2004136894 | A | * | 5/2004 |

*Primary Examiner* — Chuck Mah

(57) ABSTRACT

A handcart caster is provided with a bracket and a rolling wheel component disposed on a lower end of the bracket; a radial directional convex part disposed on an upper part of the bracket; a rolling bearing disposed in a cavity of the radial directional convex part, the rolling bearing including an outer ring of a bearing, an inner ring of the bearing, a plurality of steel balls disposed between the outer ring of the bearing and the inner ring of the bearing, and two-layer grooves disposed on surfaces of the outer ring of the bearing and the inner ring of the bearing facing each other wherein the steel balls are disposed in the two-layer grooves, the cage is disposed outside of the steel balls; and convex ridges for fixing the outer ring of the bearing disposed on an inner wall of the radial directional convex part.

3 Claims, 2 Drawing Sheets

(56) References Cited

U.S. PATENT DOCUMENTS

| | | | |
|---|---|---|---|
| 6,227,714 B1* | 5/2001 | Obara | 384/512 |
| 7,065,828 B2* | 6/2006 | Sorensen | 16/45 |
| 7,698,780 B2* | 4/2010 | Yan | 16/35 R |
| 8,382,379 B2* | 2/2013 | Doeppling et al. | 384/568 |
| 2004/0060149 A1* | 4/2004 | Chang | 16/20 |
| 2008/0258540 A1* | 10/2008 | Hicks et al. | 301/111.01 |

* cited by examiner

HANDCART CASTER

BACKGROUND OF THE INVENTION

1. Field of the Invention

The invention relates to wheels of handcart and more particularly to a handcart caster.

2. Description of Related Art

The handcart is a pickup vehicle being pushed or pulled by human power, and it is the earliest ancestor of all kinds of vehicles. Although the continuous development of stuff-pickup technique of handcart, the handcart is still used till now as an indispensible pickup tool, mainly used in supermarkets, stores and production lines. The reason of wide using of handcart in producing and life is its cheap cost, easy maintenance, convenient operation, light weight and it can work in the places where the motor vehicles can not be used conveniently, and it is very convenient when the handcart is used to carry lighter stuffs in short distance.

The supermarket handcart has guiding, omni-directional or braking caster, and no matter it is guiding, omni-directional or braking caster, it includes bracket and rolling wheels set on the lower end of the bracket. And it is set flexible component on the joint of the bracket and the support shaft of the handcart. The flexible component mainly is rolling bearing, and no matter the caster with brake or the caster without brake, when the caster is installed on the handcart, and after the flexible component of caster and the support shaft are connected, if the axial directional orientation is not good or not firm, the handcart easily generated axial directional shake. So, in order to assure there is no axial directional shake happened or small shake range, the flexible component is needed to install firmly and has anti-shake effect itself.

In the Chinese patent publishing no. CN201291712Y, it is disclosed a kind of supermarket handcart caster. The handcart caster includes eccentric bracket component and rolling wheel component installed on the lower end of the eccentric bracket component, and it is set rolling bearing on the upper end of the eccentric bracket component, and the rolling bearing is connected with the support shaft of the handcart. As it is can be seen from the drawings of the publishing patent, the rolling bearing is deep groove ball bearing, and the steel balls are set single row in the bearing and the steel balls is linearly connected with the inner ring and outer ring of the bearing. When the axial directional shake of the support shaft of handcart happened, the linear connection of single-line steel balls and the inner ring and outer ring is extremely unstable, and the axial directional stress is smaller, and it is not suitable to carry heavy-duty cargos.

In the Chinese patent publishing no. CN201982492U, it is disclosed a kind of ball bearing used in handcart caster. The bearing includes inner axle with rollaway nest on its outer surface and steel balls rollingly set in the rollaway nest along the peripheral direction of the inner axle with the equivalent distance. The steel balls are single row balls and the steel balls are linear connected with inner ring and outer ring of the bearing. When the support shaft of the handcart generated axial directional shake, the linear connection of the single-row steel balls and the inner ring and outer ring is also extremely unstable.

Notwithstanding the prior art, the invention is neither taught nor rendered obvious thereby.

SUMMARY OF THE INVENTION

The aim of the invention is to provide a kind of handcart caster which is connected firmly with support shaft of the handcart and will not generate axial directional shake as carrying heavy-duty cargos in order to resolve the present drawbacks of the conventional handcart caster.

In order to realize the aim, the technique solution of the invention is: A handcart caster, which includes bracket and rolling wheel component set on the lower end of the bracket, and a radial directional convex part is set on the upper part of the bracket, and the rolling bearing is set in the cavity of the radial directional convex part, and the rolling bearing includes outer ring of bearing, inner ring of bearing and steel balls set between the outer ring of bearing and inner ring of bearing, and two-layer grooves which are designed purposely for this patent are set on the surfaces of the outer ring of bearing and inner ring of bearing facing each other, and the steel balls are set in the two-layer grooves, the cage is set outside of the steel balls; multiple convex ridges fixing the outer ring of the bearing are set on the inner wall of the radial directional convex part.

In the above-mentioned handcart caster, the convex ridges are distributed along the circumference of the outer ring of bearing.

In the above-mentioned handcart caster, the convex ridges are molded with the radial directional convex part of the bracket as one body.

In the above-mentioned handcart caster, the two-layer grooves on the surfaces of the outer ring of bearing and inner ring of bearing facing each other overlap along radial direction.

In the above-mentioned handcart caster, the brake pad is set on the lower part of the rolling wheel component.

The advantageous effect of the invention is as follows: the convex ridge of the handcart caster plays a fixing effect to the outer ring of the bearing. After the bearing is installed on the radial directional convex part, the convex ridge assures the axial orientation of the outer ring of the bearing, and the rolling bearing of the handcart caster has two-row steel balls, so as to overcome the unstable phenomena of the linear connection of single-row steel balls with the inner ring of the bearing and the outer ring of the bearing. Under the condition that the convex ridge of the handcart caster plays a fixing effect to the outer ring of the bearing, the inner ring of bearing also increases radial directional deflection though two-row steel balls, and plays radial orientation effect to the support shaft of the handcart and constrains the shaking tendency of the support shaft, and increases the torque and carrying capacity, and decreases the quantity of axial and radial drifting, and operates stably, and increases service life, and decreases rejection rate in the process of machining.

The above and other objects, features and advantages of the invention will become apparent from the following detailed description taken with the accompanying drawings.

DETAILED DESCRIPTION OF THE INVENTION

Figure 1:
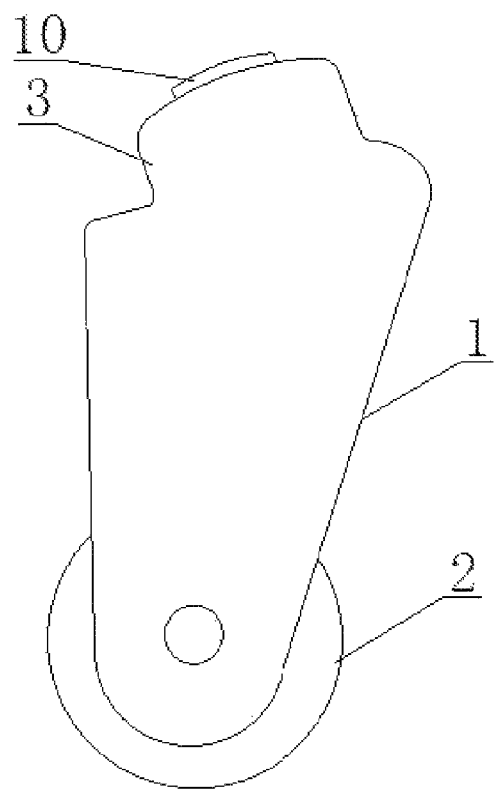
FIG. 1 is a schematic diagram of the invention.
Figure 2:
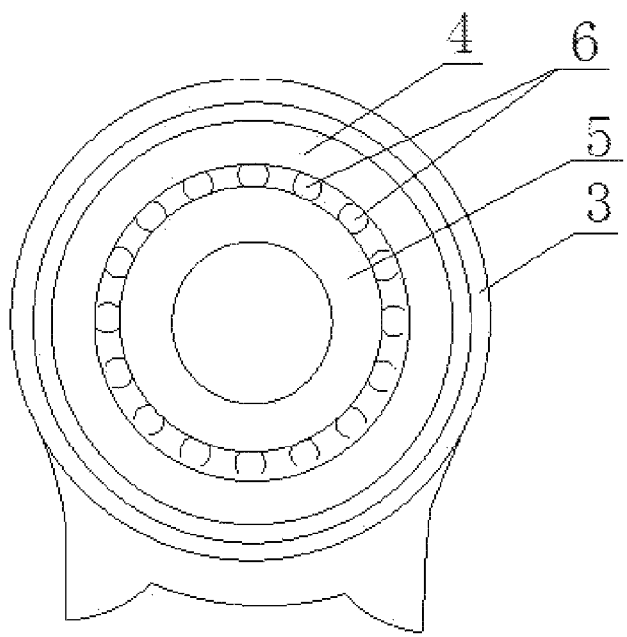
FIG. 2 is a top view of the invention.
Figure 3:
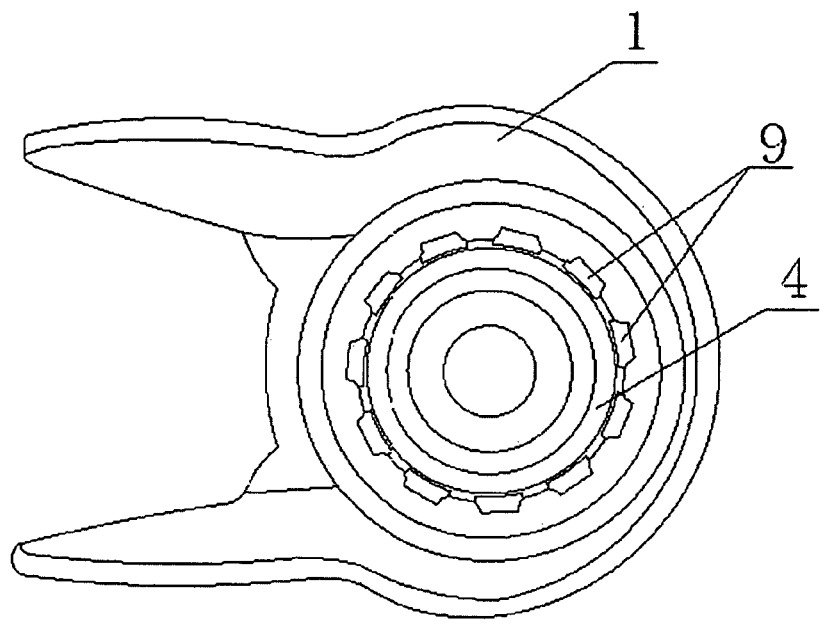
FIG. 3 is a bottom view of the invention.
Figure 4:
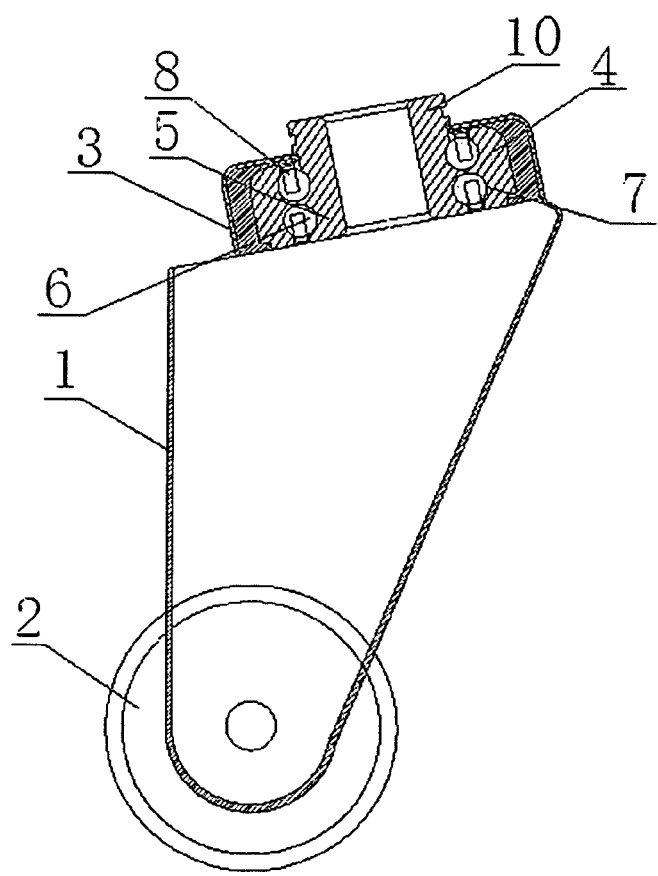
FIG. 4 is a sectional view of the invention.

Referring to FIGS. 1 to 4, a handcart caster of the invention comprises a bracket 1 and rolling wheel component 2 set on the lower end of the bracket 1, and a radial directional convex part 3 is set on the upper part of the bracket 1, and the rolling bearing is set in the cavity of the radial directional convex part 3, and the rolling bearing includes outer ring of bearing 4, inner ring of bearing 5 and steel balls 6 set between the outer ring of bearing 4 and inner ring of bearing 5.

Improvements of the invention are detailed below. Two-layer grooves 7 are set on the surfaces of the outer ring of bearing 4 and inner ring of bearing 5 facing each other, and the steel balls 6 are set in the two-layer grooves 7, the cage 8 is set outside of the steel balls 6 and so as to the steel balls 6 rotate within the fixed position of the cage 8; multiple convex ridges 9 fixing the outer ring of bearing 4 are set on the inner wall of the radial directional convex part 3, the convex ridges 9 are distributed along the circumference of the outer ring of bearing 4 and are molded with the radial directional convex part 3 of the bracket as one body.

In the invention, the two-layer grooves 7 on the surfaces of the outer ring of bearing 4 and inner ring of bearing 5 facing each other overlap along radial direction. Certainly, in order to assure the braking effect of the rolling wheel component 2, the brake pad (not shown) is set on the lower part of the rolling wheel component 2, and the inner ring of bearing 5 has convex rim 10 extending outward radial direction. Connecting screw-threads or slots are set on the outside of the convex rim so that the inner ring of bearing 5 is connected firmly with the support shaft of the handcart and the convenience of the connection.

When the handcart caster is used, the support shaft of handcart is installed directly in the inner ring of bearing 5 of the rolling bearing. According to the actual need, the quantity of handcart casters on the bottom of the handcart can change randomly, and the casters with braking pad and the casters without braking pad can be used together. The convex ridge 9 of the handcart caster plays a fixing effect to the outer ring of bearing 4. After the bearing is installed on the radial directional convex part 3, the convex ridge 9 assures the axial orientation of the outer ring of bearing 4, and the rolling bearing of the handcart caster has two-row steel balls 6, so as to overcome the unstable phenomena of the linear connection of single-row steel balls with the inner ring of the bearing and the outer ring of the bearing. Under the condition that the convex ridge 9 of the handcart caster plays a fixing effect to the outer ring of bearing 4, the inner ring of bearing 5 also increases radial directional deflection though two-row steel balls 6, and plays radial orientation effect to the support shaft of the handcart and constrains the shaking tendency of the support shaft, and increases the torque and carrying capacity, and decreases the quantity of axial and radial drifting, and operates stably, and increases service life, and decreases rejection rate in the process of machining.

The above-mentioned subscription shows the basic principle, major features and advantages of the invention. The technicians of the field should understand that the invention is not limited by the above-mentioned examples, and the subscription of the above-mentioned examples and specification is only the principle of the invention. The invention can also have various modifications and improvements without deviating the spirit and scope of the invention, and those modifications and improvements are all fallen in the protective range of the invention. The scope of the invention is to be limited only by the appended claims.

What is claimed is:

1. A handcart caster, comprising:
  a bracket and a rolling wheel component disposed on a lower end of the bracket;
  a radial directional convex part disposed on an upper part of the bracket;
  a rolling bearing disposed in a cavity of the radial directional convex part, the rolling bearing including an outer ring of a bearing, an inner ring of the bearing, a plurality of steel balls disposed between the outer ring of the bearing and the inner ring of the bearing, and two-layer grooves disposed on surfaces of the outer ring of the bearing and the inner ring of the bearing facing each other wherein the steel balls are disposed in the two-layer grooves and a cage is disposed outside of the steel balls; and
  a plurality of convex ridges for fixing the outer ring of the bearing disposed on an inner wall of the radial directional convex part, wherein the inner ring of the bearing has a convex rim extending outward in a radial direction, and a connecting screw-thread or slot is disposed externally of the convex rim.

2. The handcart caster of claim 1, wherein the convex ridges are distributed along a circumference of the outer ring of the bearing.

3. The handcart caster of claim 1, wherein the convex ridges are integrally molded with the radial directional convex part.

* * * * *